United States Patent [19]

Suzuki et al.

[11] Patent Number: 5,528,525
[45] Date of Patent: Jun. 18, 1996

[54] PROCESSOR FOR DETERMINING SHIFT COUNTS BASED ON INPUT DATA

[75] Inventors: Hidekazu Suzuki, Yamatokoriyama; Masashi Kubota, Kobe; Seiji Nakai, Osaka; Toshiro Nishio, Kyoto, all of Japan

[73] Assignee: Matsushita Electric Industrial Co., Ltd., Osaka, Japan

[21] Appl. No.: 444,739

[22] Filed: May 19, 1995

Related U.S. Application Data

[63] Continuation of Ser. No. 135,784, Oct. 13, 1993, abandoned.

[30] Foreign Application Priority Data

Oct. 16, 1992 [JP] Japan ..................................... 4-278402
Dec. 17, 1992 [JP] Japan ..................................... 4-336485

[51] Int. Cl.$^6$ .................................................. G06F 7/38
[52] U.S. Cl. .................... 364/715.08; 364/748; 364/736; 395/375; 395/800
[58] Field of Search .................................... 395/800, 375; 364/715.08, 715.06, 748, 736

[56] References Cited

U.S. PATENT DOCUMENTS

| | | | |
|---|---|---|---|
| 3,914,744 | 10/1975 | Brown | 364/715.08 |
| 4,456,955 | 6/1984 | Yanagita et al. | 395/375 |
| 4,700,324 | 10/1987 | Doi et al. | 364/745 |
| 4,754,412 | 6/1988 | Deering | 364/736 |
| 4,785,393 | 11/1988 | Chu et al. | 395/375 |
| 4,839,738 | 6/1989 | Kaku et al. | 358/261.2 |
| 4,979,139 | 12/1990 | Nakayama | 364/715.01 |
| 5,021,986 | 6/1991 | Nakamura | 364/748 |
| 5,031,135 | 7/1991 | Patel et al. | 364/745 |
| 5,072,418 | 12/1991 | Boutaud et al. | 364/715.06 |
| 5,097,435 | 3/1992 | Takahashi | 364/766 |
| 5,148,517 | 9/1992 | Suzuki et al. | 395/115 |
| 5,309,382 | 5/1994 | Tamura et al. | 364/715.08 |

FOREIGN PATENT DOCUMENTS 60-230266 11/1985 Japan.
60-247781 12/1985 Japan.
62-11933 1/1987 Japan.

OTHER PUBLICATIONS

C. Champlin et al., "Array-Based Logic Boosts System Performance", *Computer Design*, vol. 23, No. 5, pp. 93–94, 96, 98, & 100 (May, 1984).
European Search Report dated Feb. 8, 1994.

*Primary Examiner*—Alyssa H. Bowler
*Assistant Examiner*—John Follansbee
*Attorney, Agent, or Firm*—Ratner & Prestia

[57] ABSTRACT

The disclosed processor includes: a first shifter for receiving a first signal and for shifting first input data in accordance with the first signal; a second shifter for receiving a second signal and for shifting second input data in accordance with the second signal; an operation unit, connected to the first shifter and the second shifter, for performing arithmetic and logic operations for the output of the first shifter and the output of the second shifter; a third shifter, connected to the operation unit, for receiving a third signal and for shifting the output of the operation unit in accordance with the third signal; a first coefficient register for storing a coefficient for the first input data; a second coefficient register for storing a coefficient for the second input data; and a shift control unit connected to the first shifter, the second shifter, the third shifter, the first coefficient register, and the second coefficient register, for determining shift counts for the first shifter, the second shifter, and the third shifter, respectively, as a function of the first input data, the second input data, the coefficient stored in the first coefficient register, and the coefficient stored in the second coefficient register, and for outputting signals indicative of the determined shift counts to the first shifter, the second shifter, and the third shifter, as the first signal, the second signal, and the third signal, respectively.

7 Claims, 6 Drawing Sheets

PROCESSOR FOR DETERMINING SHIFT COUNTS BASED ON INPUT DATA

This application is a continuation of application Ser. No. 08/135,784 filed Oct. 13, 1993, now abandoned.

BACKGROUND OF THE INVENTION

1. Field of the Invention

The present invention relates to a processor used in a micro processor, a digital signal processor, or the like.

2. Description of the Related Art

A conventional micro processor or a conventional digital signal processor performs an operation including one or more steps of processing two pieces of input data, so as to obtain the result of the operation. Hereinafter, a conventional processor is described.

FIG. 9 shows a construction of a conventional processor. The processor includes an arithmetic and logic unit (ALU) 1 for performing arithmetic and logic operations, a register 2, a shifter 3, and a register 4. The ALU 1 performs an addition, a subtraction, or the like for the data of a first input and a second input in accordance with an operation control signal. The register 2 temporarily stores data output from the ALU 1. The shifter 3 shifts the data of the second input. A shift count for the shifter 3 is predetermined and stored in the register 4. In another construction, the shifter 3 and the register 4 may be connected to the first input instead of the second input.

It will be described below how the processor having the above construction works by using a typical operation expressed by Equation (1) as an example.

$$Z = X/4 + Y/2 \quad (1)$$

In Equation (1), X and Y represent data of the two inputs, respectively, and Z represents an output data from the processor. In a first step, X is applied to the second input and 0 is applied to the first input. As a control signal, an adding instruction (ADD) is applied to the ALU 1. In accordance with the value stored in the register 4, the shifter 3 shifts X to the right by 2 bits, so as to obtain X/4, which is stored in the register 2.

In a second step, the value stored in the register 2 which is obtained in the first step, i.e., X/4 is applied to the first input, and Y is applied to the second input. The shifter 3 shifts Y to the right by 1 bit in accordance with the value stored in the register 4. An adding instruction (ADD) is again applied to the ALU 1, so as to obtain Z expressed by Equation (1).

However, the processor has a problem in that, in order to obtain an operation result with a reduced error in the conventional construction, it is necessary to control the shifting by determining which is first performed, the shifting or the operation, depending on the characteristics of the input data (i.e., the value of the input data), and by setting the contents of the register 4 by a program. The problem will be analyzed below in detail.

As to the timing of the shifting, for example, there are three calculating manners for Equation (1).

$$Z = (X + 2Y)/4 \quad (2)$$

$$Z = (X/2 + Y)/2 \quad (3)$$

$$Z = X/4 + Y/2 \quad (4)$$

In the processor shown in FIG. 9, for example, in Equation (2), Y which is shifted to the left by 1 bit is added to X, and then a shifting to the right by 2 bits is performed, so as to obtain Z. In Equation (3), Y which is shifted to the left by 0 bit is added to X which is shifted to the right by 1 bit, and then a shifting to the right by 1 bit is performed, so as to obtain Z. In Equation (4), the calculating manner is the same as that in Equation (1), so that the shifting is performed as described above. In the operations of Equations (2), (3), and (4), the probability that an overflow occurs in the ALU 1 decreases in the order of (2), (3), and (4). However, the round off error in the operation becomes larger in this order. Therefore, in order to obtain an optimum operation result without causing an overflow and with a small error, optimum processing must be performed in view of the shift count to the left by which the overflow will occur in the ALU 1 depending on the value of the input data. For this purpose, it is necessary to determine the timing of the shifting, that is, whether the shifting is performed before the addition of the two pieces of data, or after the addition of the two pieces of data by a program, and to set the contents of the register 4, for each processing. This constitutes the problem.

SUMMARY OF THE INVENTION

The processor of this invention includes: first shift means for receiving a first signal and for shifting first input data in accordance with the first signal; second shift means for receiving a second signal and for shifting second input data in accordance with the second signal; operation means, connected to the first shift means and the second shift means, for performing arithmetic and logic operations for the output of the first shift means and the output of the second shift means; third shift means, connected to the operation means, for receiving a third signal and for shifting the output of the operation means in accordance with the third signal; first coefficient storing means for storing a coefficient for the first input data; second coefficient storing means for storing a coefficient for the second input data; and shift control means connected to the first shift means, the second shift means, the third shift means, the first coefficient storing means, and the second coefficient storing means, for determining shift counts for the first shift means, the second shift means, and the third shift means, respectively, as a function of the first input data, the second input data, the coefficient stored in the first coefficient storing means, and the coefficient stored in the second coefficient storing means, and for outputting signals indicative of the determined shift counts to the first shift means, the second shift means, and the third shift means, as the first signal, the second signal, and the third signal, respectively.

In one embodiment of the invention, the shift control means includes: first maximum possible shift count determining means for determining the maximum possible shift count $A_{MAX}$ for the first input data; second maximum possible shift count determining means for determining the maximum possible shift count $B_{MAX}$ for the second input data; bit shift difference calculating means, connected to the first coefficient storing means and the second coefficient storing means, for obtaining a difference d between the coefficient $R_1$ stored in the first coefficient storing means and the coefficient $R_2$ stored in the second coefficient storing means; and shift count determining means connected to the first maximum possible shift count determining means, the second maximum possible shift count determining means, and the bit shift difference calculating means, for determining shift counts for the first shift means and the second shift means as a function of the maximum possible shift count $A_{MAX}$, the maximum possible shift count $B_{MAX}$, and the difference d, and for determining a shift count in the third shift means based on one of the determined shift counts for the first shift means and the second shift means.

In another embodiment of the invention, the shift count determining means determines the maximum value of A as the shift count for the first shift means, and the maximum value of B as the shift count for the second shift means, A and B satisfying the conditions of A−B=d, and $A \leq A_{MAX}$ and $B \leq B_{MAX}$, and the shift count determining means determines C as the shift count in the third shift means, C satisfying the condition of $C=R_1-A$ or $C=R_2-B$.

In another embodiment of the invention, each of the first maximum possible shaft count determining means and the second maximum possible shift count determining means includes: most significant bit detecting means for detecting the position where a bit of "1" first appears by checking the input data from the most significant bit; and maximum possible shift count calculating means for calculating the maximum possible shift count for the input data, based on the detected position.

In another embodiment of the invention, wherein each of the first maximum possible shift count determining means and the second maximum possible shift count determining means includes: least significant sign bit detecting means for detecting, when the most significant bit of the input data is "1", the position where a bit of "0" first appears by checking the input data from the most significant bit, and for detecting, when the most significant bit of the input data is "0", the position where a bit of "1" first appears by checking the input data from the most significant bit; and maximum possible shift count calculating means for calculating the maximum possible shift count for the input data, based on the detected position.

In another embodiment of the invention, to each of the first shift means, the second shift means, the third shift means, and the shift control means, a control signal indicating whether the input data is signed binary data or unsigned binary data is applied.

In another embodiment of the invention, to each of the first shift means, the second shift means, and the third shift means, a control signal indicating whether the input data is signed binary data or unsigned binary data is applied, and wherein each of the first shift means, the second shift means, and the third shift means includes: logic shift means for logically shifting the input data; arithmetic shift means for arithmetically shifting the input data; and selecting means, connected to the logic shift means and the arithmetic shift means, for selectively outputting either one of the output of the logic shift means or the output of the arithmetic shift means.

In another embodiment of the invention, to each of the first maximum possible shift count determining means and the second maximum possible shift count determining means, a control signal indicating whether the input data is signed binary data or unsigned binary data is applied, and wherein each of the first maximum possible shift count determining means and the second maximum possible shift count determining means includes: most significant bit detecting means for detecting the position where a bit of "1" first appears by checking the input data from the most significant bit; least significant sign bit detecting means for detecting, when the most significant bit of the input data is "1", the position where a bit of "0" first appears by checking the input data from the most significant bit, and for detecting, when the most significant bit of the input data is "0", the position where a bit of "1" first appears by checking the input data from the most significant bit; selecting means, connected to the most significant bit detecting means and the least significant sign bit detecting means, for selectively outputting either one of the output of the most significant bit detecting means or the output of the least significant sign bit detecting means; and maximum possible shift count calculating means, connected to the selecting means, for calculating the maximum possible shift count for the input data, based on the output of the selecting means.

Thus, the invention described herein makes possible the advantage of providing a processor which automatically performs a shifting depending on the value of input data so as to obtain an optimum operation result without causing an overflow and with an error as small as possible.

This and other advantages of the present invention will become apparent to those skilled in the art upon reading and understanding the following detailed description with reference to the accompanying figures.

DESCRIPTION OF THE PREFERRED EMBODIMENTS

Hereinafter, a processor of one example according to the invention will be described in detail with reference to the drawings.

Figure 1:
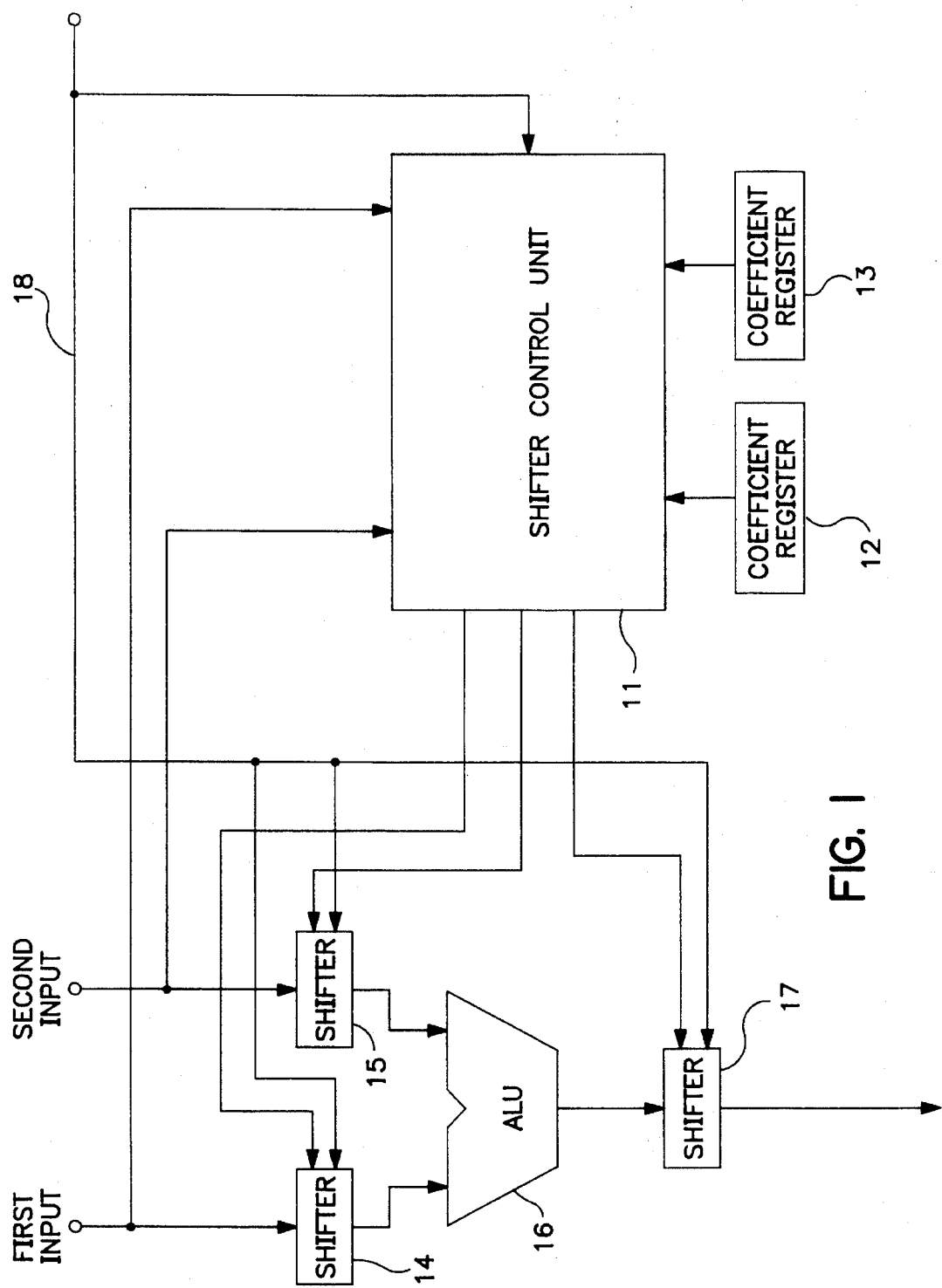
FIG. 1 is a block diagram of a processor of one example according to the invention.

FIG. 1 is a block diagram of the processor of the example. In FIG. 1, the processor includes a shifter control unit 11, a coefficient register 12, and a coefficient register 13. The shifter control unit 11 is connected to a first input and a second input, and controls the shiftings by a shifter 14, a shifter 15, and a shifter 17. The coefficient register 12 stores a coefficient for the first input. The coefficient stored in the coefficient register 12 is represented by a shift count, regarding the left direction as being positive. For example, when the coefficient for the first input is ¼, a shift count "−2" is previously stored in the coefficient register 12, and when the coefficient for the first input is 4, a shift count "2" is previously stored in the coefficient register 12. The coefficient register 13 is identical to the coefficient register 12 in construction, and stores a coefficient for the second input.

The processor shown in FIG. 1 further includes a shifter 14 connected to the shifter control unit 11 and the first input, a shifter 15 connected to the shifter control unit 11 and the second input, an arithmetic and logic unit (ALU) 16 connected to the outputs of the shifters 14 and 15, and a shifter 17 connected to the shifter control unit 11 and the output of the ALU 16.

The shifter 14 receives a first shift count from the shifter control unit 11, and shifts the data of the first input in accordance with the first shift count. The shifter 15 receives a second shift count from the shifter control unit 11, and shifts the data of the second input in accordance with the second shift count. The ALU 16 performs an arithmetic and logic operation for the outputs of the shifters 14 and 15, and outputs the result of the operation to the shifter 17. The shifter 17 receives a third shift count from the shifter control unit 11, and shifts the output of the ALU 16 in accordance with the third shift count. Herein, all the shifters 14, 15, and 17 can shift data bidirectionally by any desired number of bits.

In this example, a control signal line 18 is connected to the shifter control unit 11, and the shifters 14, 18, and 17. A control signal for switching between an arithmetic shift and logic shift depending on the type of the data of the first input and the second input, i.e., signed binary data or unsigned binary data, is supplied to the control signal line 18, so that the shifter control unit 11, the shifters 14, 15, and 17 are switched between the arithmetic shift and the logic shift in accordance with the control signal.

The construction of the shifter control unit 11 will be described in detail with reference to FIG. 2. The shifter control unit 11 includes a maximum possible shift count determining unit 21, a maximum possible shift count determining unit 22, and a shift count determining unit 23. The maximum possible shift count determining unit 21 is connected to the first input, and determines the maximum number of bits to be shifted without causing an overflow for the data of the first input. The maximum possible shift count determining unit 22 is connected to the second input, and determines the maximum number of bits to be shifted without causing an overflow for the data of the second input. The shift count determining unit 23 is connected to the maximum possible shift count determining units 21 and 22 and the coefficient registers 12 and 13, and determines the shift counts for the shifters 14, 15, and 17, respectively, based on the outputs of the maximum possible shift count determining units 21 and 22, and the coefficients stored in the coefficient registers 12 and 13.

The construction of the maximum possible shift count determining unit 21 will be described in detail with reference to FIG. 3. The maximum possible shift count determining unit 22 is identical with the maximum possible shift count determining unit 21 in construction, so that the description thereof is omitted. The maximum possible shift count determining unit 21 includes a most significant bit detector 31, a least significant sign bit detector 32, a selector 33, and a maximum possible shift count calculator 34. In the case where the input is unsigned binary data, the most significant bit detector 31 detects the position where a bit of "1" first appears by checking the input data from the most significant bit. In the case where the input is signed binary data, the least significant sign bit detector 32 detects a least significant sign bit. The selector 33 is connected to the most significant bit detector 31 and the least significant sign bit detector 32, and switches over the output thereof depending on the control signal applied via the control signal line 18. The maximum possible shift count calculator 34 is connected to the selector 33, and calculates the maximum number of bits which can be shifted to the left based on the output from the selector 33.

The construction of the shift count determining unit 23 in FIG. 2 will be described with reference to FIG. 4. The shift count determining unit 23 includes a bit shift difference calculator 41 and a shift count calculator 42. The bit shift difference calculator 41 is connected to the coefficient registers 12 and 13, and calculates a difference between bit shift counts of the two pieces of input data, based on the values stored in the coefficient registers 12 and 13. The shift count calculator 42 is connected to the maximum possible shift count determining units 21 and 22, the sifters 14, 15, and 17, and the bit shift difference calculator 41. The shift count calculator 42 calculates the shift counts for the shifters 14, 15, and 17, respectively, based on the outputs of the maximum possible shift count determining units 21 and 22, and the difference between bit shift counts of the two pieces of input data obtained by the bit shift difference calculator 41.

The operation of the processor having the above construction will be described. For explanation, the data of the first input is represented by X, the data of the second input is represented by Y, and the data output from the shifter 17 is represented by Z. The operation of the processor is described by way of an example in which the operation expressed by Equation (5) is performed.

$$Z = X/4 + Y/2 \qquad (5)$$

Prior to the operation, the function of the ALU 16 is previously set to be ADD (addition) or SUB (subtraction) by the instruction signal. In addition, it is necessary to previously store the left shift counts of X and Y in the coefficient registers 12 and 13, respectively. If it is assumed that the value stored in the coefficient register 12 is denoted by $R_1$, and the value stored in the coefficient register 13 is denoted by $R_2$, $R_1=-2$ and $R_2=-1$ in the operation expressed by Equation (5) because the coefficient of X is ¼ and the coefficient of Y is ½.

Now, the width of the input data is denoted by n. For example, it is assumed That, n=8 (bits), and signed binary data of X=11110000 and Y=00000110 are input to the processor. In this case, when the data X and Y are input, a control signal is applied to the control signal line 18 so as to perform a processing suitable for the signed binary data in the shifter control unit 11 and in the shifter 17.

The shifter control unit 11 controls the shifting operations in the shifters 14, 15, and 17, based on the values of $R_1$ and $R_2$, and the values of X and Y. The operation of the shifter control unit 11 shown in FIG. 2 will be next described. The control signal line 18 applies a control signal to the shifter control unit 11 so that the maximum possible shaft count determining units 21 and 22 perform the processing suitable for the signed binary data.

Figure 3:
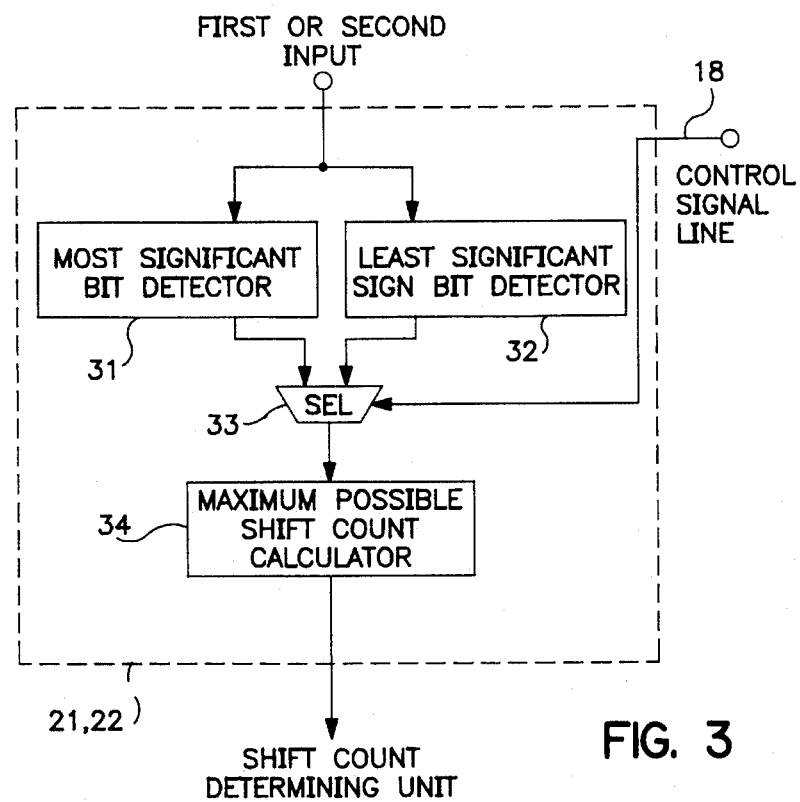
FIG. 3 is a block diagram showing a construction of a maximum possible shift count determining unit shown in FIG. 2.

Now, the operation of the maximum possible shift count determining unit 21 shown in FIG. 3 is described. Since the data of the first and second inputs are signed binary data in this example, the processed result of the least significant sign bit detector 32 is required. Accordingly, the selector 33 is set so as to select the output of the least significant sign bit detector 32 by the control signal via the control signal line 18.

In the least significant sign bit detector 32, if the most significant bit (hereinafter, referred to as the "MSB") of the input data is 1 (if the data is negative), the bits are checked from the MSB to the lower significant bits as to which bit position the value is first changed from 1 to 0. The bit position is detected by counting the number of bits from the least significant bit (hereinafter, referred to as the "LSB" which is located at a 0th bit position). If the MSB of the input data is 0, the bits are checked from the MSB to the lower significant bits as to which bit position the value is first changed from 0 to 1. The bit position is detected by counting the number of bits from the LSB. Herein, the detected value is represented by p (the pth bit). In the case where X=11110000 is checked from the MSB, the seventh to fourth bits are all 1, and the third bit is the first bit of 0. In this case, the fourth bit can be regarded as the least significant sign bit, the detected value of the least significant sign detector 32 is p=4. In the maximum possible shift count calculator 34, the operation expressed by Equation (6) is performed, so that the maximum possible number of left bit shifts is calculated.

$$k=n-p-2 \qquad (6)$$

In the case of X=11110000, the calculated value k=2 (bits). The operation of the maximum possible shift count determining unit 22 is identical with that of the maximum possible shift count determining unit 21. The detected value by the least significant sign bit detector 32 is p=3, and the calculated value in the maximum possible shift count calculator 34 is k=3 (bits). Accordingly, $A_{MAX}=2$ and $B_{MAX}=3$ where the output of the maximum possible shift count determining unit 21 is represented by $A_{MAX}$, and the output of the maximum possible shift count determining unit 22 is represented by $B_{MAX}$.

Figure 2:
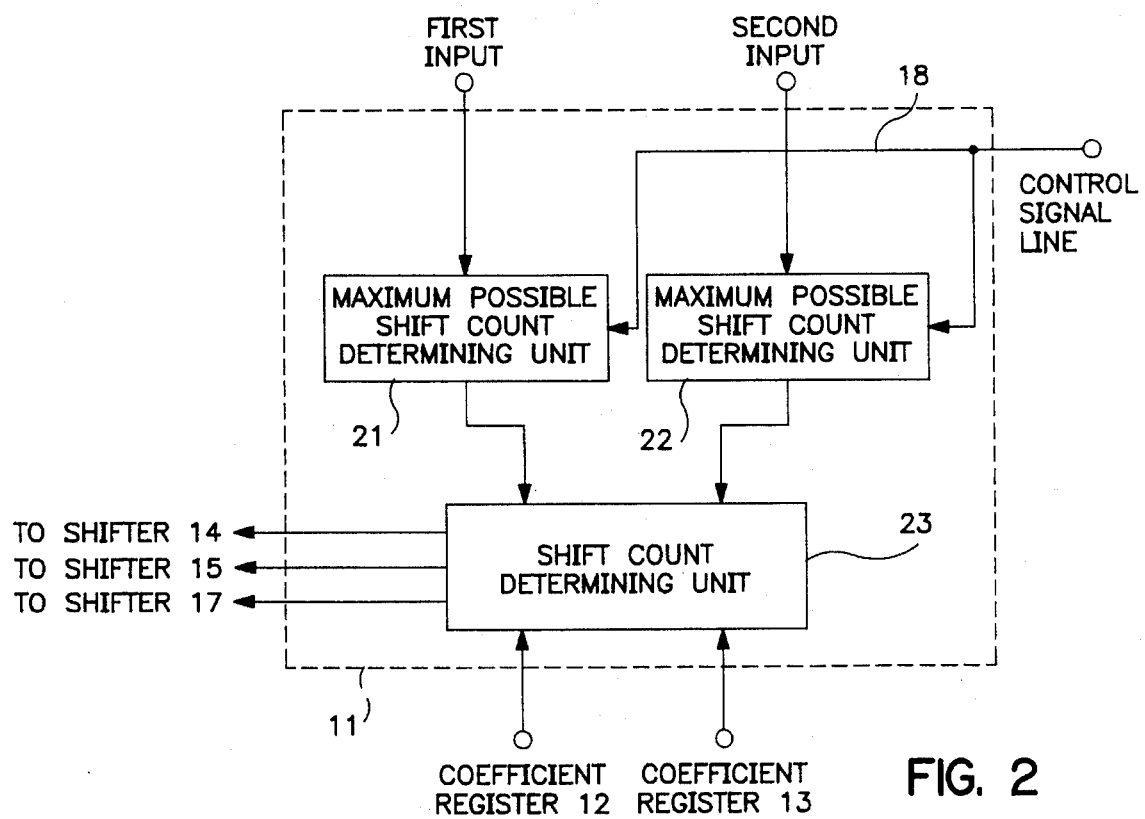
FIG. 2 is a block diagram showing a construction of a shifter control unit shown in FIG. 1.

Next, the operation of the shift count determining unit 23 shown in FIG. 2 is described. In the shift count determining unit 23, the shift counts for the shifters 14, 15, and 17 are determined based on the outputs of the maximum possible shift count determining units 21 and 22, and the values in the coefficient registers 12 and 13. Prior to the operation, in the shift count determining unit 23, the bit shift difference calculator 41 shown in FIG. 4 calculates a difference d between the left shift count for the first input and the left shift count for the second input, and the obtained difference is $d=R_1-R_2=-1$. The shift count calculator 42 shown in FIG. 4 calculates the shift counts output to the shifters 14, 15, and 17 based on the output value d of the bit shift difference calculator 41, the output value $A_{MAX}$ of the maximum possible shift count determining unit 21 and the output value $B_{MAX}$ of the maximum possible shift count determining unit 22. The calculation method is described below. The shift counts output from the shift count calculator 42 to the shifters 14, 15, and 17 are represented by A, B, and C, respectively. The values of A and B are selected to be as large as possible, while A and B keep the relationship of A−B=d, and satisfy the conditions of $A \leq A_{MAX}$ and $B \leq B_{MAX}$. In this example, A=2, and B=3. C is uniquely determined based on the selected A and B. The shift count C in the shifter 17 is calculated in the following manner. Equation (5) is generally expressed by Equation (7).

$$Z=\alpha X+\beta Y \qquad (7)$$

Equation (14) which is shown below is generally expressed by Equation (8).

$$Z=\gamma(\delta X+\epsilon Y) \qquad (8)$$

By comparing the coefficients of X and Y in Equations (7) and (8), Equation (9) is obtained as follows.

$$\left.\begin{array}{l}\alpha=\gamma\delta\\ \beta=\gamma\epsilon\end{array}\right\} \qquad (9)$$

By applying logarithms having the base of 2 to both sides of Equation (9), Equation (10) is obtained as follows.

$$\left.\begin{array}{l}\log_2\alpha=\log_2\gamma+\log_2\delta\\ \log_2\beta=\log_2\gamma+\log_2\epsilon\end{array}\right\} \qquad (10)$$

In Equation (10), $\log_2\alpha$ is the coefficient of X represented by the left shift count, so that the value of $\log_2\alpha$ is equal to the value $R_1$ stored in the coefficient register 12. Similarly, $\log_2\beta$ is equal to the value $R_2$ stored in the coefficient register 13. In addition, A, B, and C can be expressed as follows. These are apparent from the definitions A, B, and C, respectively.

$$\left.\begin{array}{l}A=\log_2\delta\\ B=\log_2\epsilon\\ C=\log_2\gamma\end{array}\right\} \qquad (11)$$

When Equation (11) is substituted into Equation (10), Equation (12) is obtained as follows.

$$\left.\begin{array}{l}R_1=C+A\\ R_2=C+B\end{array}\right\} \qquad (12)$$

Based on Equation (12), C can be obtained from one of the equations $C=R_1-A$ or $C=R_2-B$. In this example, $R_1=-2$, $R_2=-1$, A=2, and B=3, so that C can be obtained as follows:

$$C=R_1-A=-2-2=-4,$$

or $$C=R_2-B=-1-3=-4.$$

As a result, the operation expressed by Equation (13) is performed.

$$Z=(4X+8Y)/16 \qquad (13)$$

The shifters 14, 15, and 17 shift data based on the shift counts A, B, and C calculated by the shift count calculator 42, respectively. Note that regarding the right shifting performed in the shifter 17, if the first and second inputs are signed binary data, the shifter 17 performs an arithmetic shift, and if the first and second inputs are unsigned binary data, the shifter 17 performs a logic shift, in accordance with the control signal applied via the control signal line 18. In this case, since the first and second inputs are signed binary data, the shifter 17 performs a right arithmetic shifting by 4 bits to the data of the output from the ALU 16.

The above processing is equivalent to Equation (14), so that an operation result with highest accuracy can be obtained, as described in the description of the prior art.

$$Z=(X+2Y)/4 \qquad (14)$$

In another example, it is assumed that n=8 (bits), and 8-bit unsigned binary data of X=00010101 and Y=00011111 are input to the processor. In FIG. 1, a control signal for the unsigned binary data is applied to the shifter control unit 11 and the shifter 17 via the control signal line 18. Since the inputs are unsigned binary data, the selector 33 selects the output of the most significant bit detector 31 in the maximum possible shift count determining unit 21 in FIGS. 2 and 3. The most significant bit detector 31 checks the input data from the MSB (most significant bit), and detects a bit at which a value of 1 first appears. The bit is counted from the LSB (the 0th bit) and is determined to be an rth bit. For X=00010101, r=4. The maximum possible shift calculator 34 performs the operation expressed by Equation (15), so as to calculate the maximum possible number of left bit shifts.

$$k=n-r-2 \qquad (15)$$

For X=00010101, the calculated value is k=2 (bits). Next, the operation of the maximum possible shift count determining unit 22 is the same as that of the maximum possible shift count determining unit 21. For Y=00011111, the detected value in the most significant bit detector 31 is r=4. The calculated value in the maximum possible shift count calculator 34 is k=2 (bits). In this case, $A_{MAX}$=2, and $B_{MAX}$=2.

Figure 4:
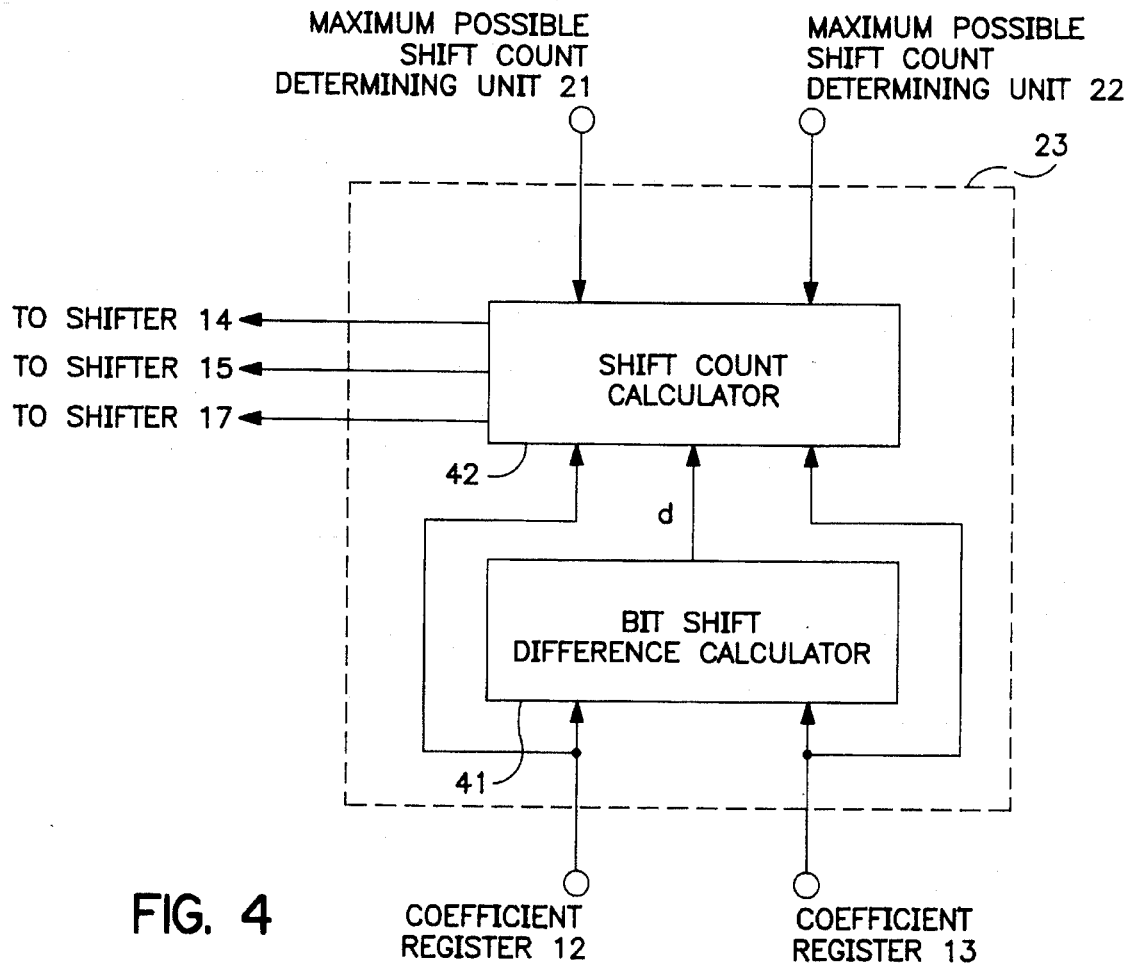
FIG. 4 is a block diagram showing a construction of a shift count determining unit shown in FIG. 2.

In the shift count calculator 42 shown in FIG. 4, by the same method as in the previous example, the shift counts for the shifters 14, 15, and 17 are calculated to be A=1, B=2, and C=−3 based on the values of $A_{MAX}$, $B_{MAX}$, and d. As a result, the operation expressed by Equation (16) is performed.

$$Z=(2X+4Y)/8 \qquad (16)$$

In this example, since the first and second inputs are unsigned binary data, the shifter 17 performs a right logic shifting by 3 bits to the output data of the ALU 16, in accordance with the control signal applied via the control signal line 18.

The operation is equivalent to Equation (17), so that an operation result with highest accuracy can be obtained, as described in the description of the prior art.

$$Z=(X+2Y)/4 \qquad (17)$$

As described above, according to the processor of the example, by providing the coefficient register 12 in which a coefficient for the data of the first input is set as a bit shift count, the coefficient register 13 in which a coefficient for the data of the second input is set as a bit shift count, the shifter control unit 11 for controlling the shifting based on the values set in the coefficient registers 12 and 13 and the values of the input data, the shifter 14 for shifting the data of the first input, the shifter 15 for shifting the data of the second input, the ALU 16 for performing an operation for the first and second inputs, and the shifter 17 for shifting the operation result in the ALU 16 in accordance with the output of the shifter control unit 11, an operation result without causing an overflow and with a reduced error can be automatically obtained depending on the value of the input data.

Figure 5:
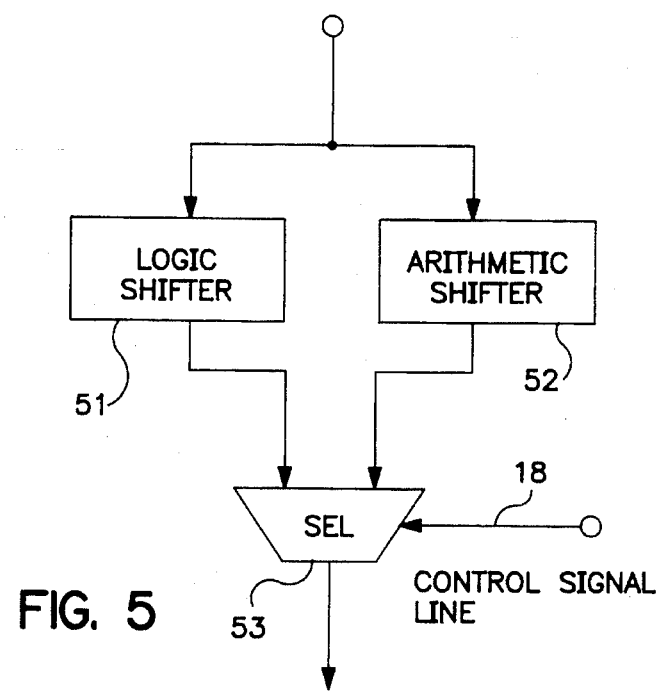
FIG. 5 shows an exemplary construction of a shifter 17.

In another example, as shown in FIG. 5, two types of shifters, i.e., a logic shifter 51 and an arithmetic shifter 52 may be provided instead of each of the shifters 14, 15, and 17. A selector 53 selects one of outputs of the logic shifter 51 and the arithmetic shifter 52 in accordance with a control signal applied via the control signal line 18. Specifically, the selector 53 selects the output of the logic shifter 51 when the input data is unsigned binary data, and selects the output of the arithmetic shifter 52 when the input data is signed binary data.

Figure 6:
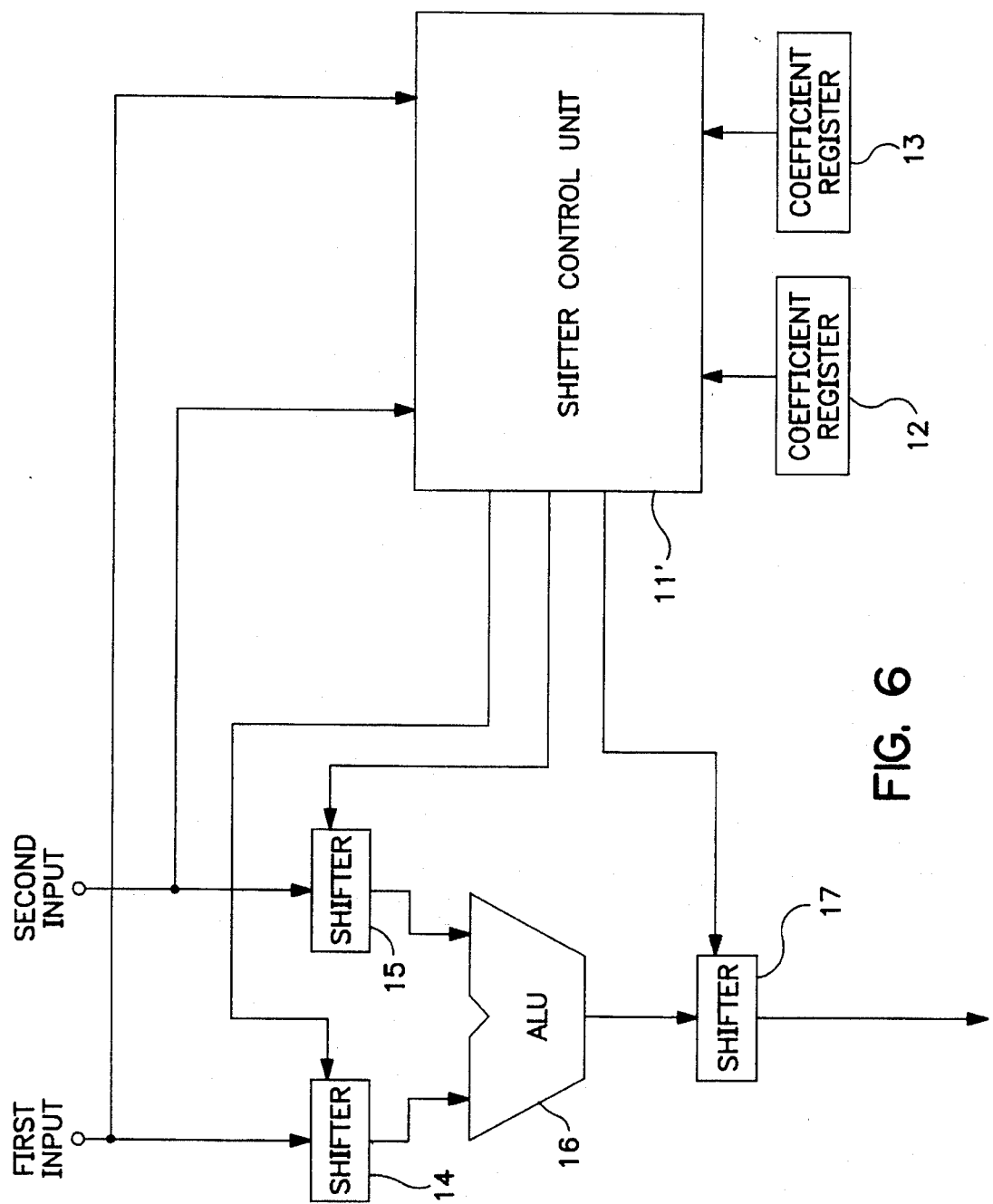
FIG. 6 is a block diagram of a processor of another example according to the invention.
Figure 7:
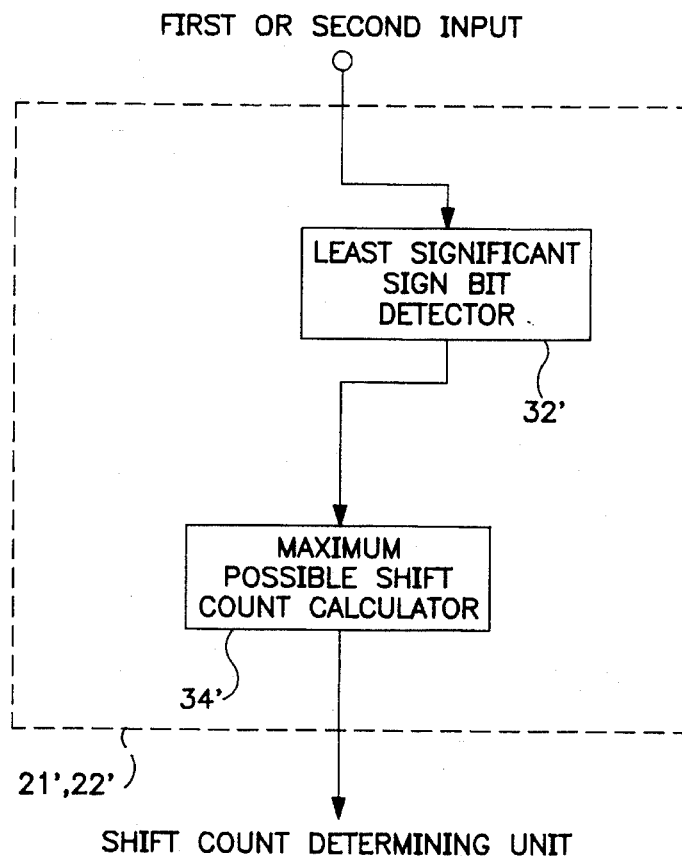
FIG. 7 is another block diagram showing a construction of a maximum possible shift count determining unit.
Figure 8:
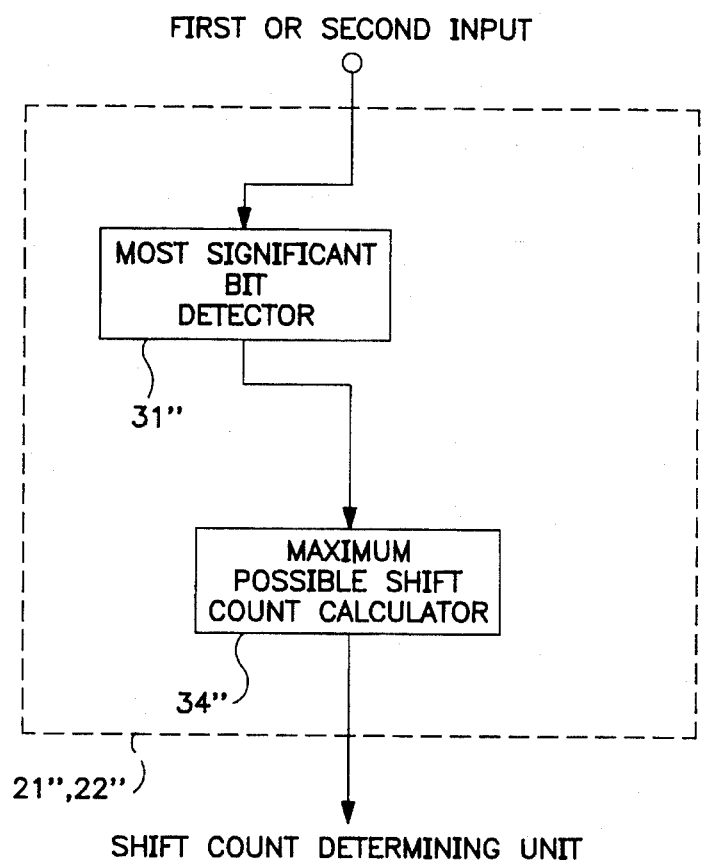
FIG. 8 is another block diagram showing a construction of a maximum possible shift count determining unit.
Figure 9:
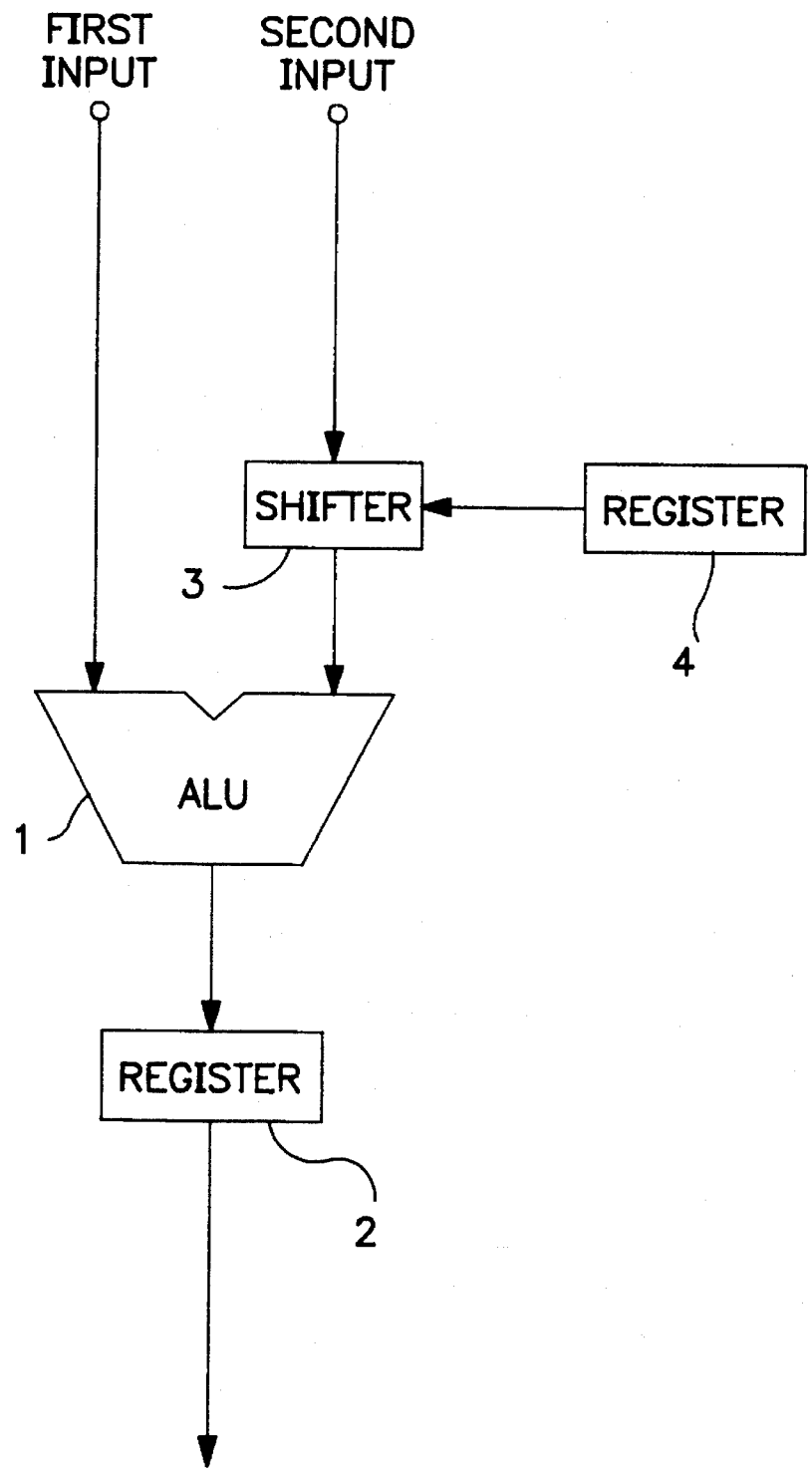
FIG. 9 is a block diagram of a processor in a prior art.

FIG. 6 is a block diagram of the processor of another example. In FIG. 6, the same components are designated by the same reference numerals as those in FIG. 1, and the descriptions thereof are omitted. When the data of the first and the second inputs are limited to only one of signed binary data and unsigned binary data, the control signal line 18 can be omitted. This is because it is not necessary to switch between an arithmetic shift and a logic shift. For example, it is assumed that the data of the first and second inputs are only signed binary data. In this case, the shifter control unit 11' shown in FIG. 6 may include maximum possible shift count determining units 21' and 22' each having a least significant sign bit detector 32' and a maximum possible shift count calculator 34', as shown in FIG. 7. The least significant sign bit detector 32' and the maximum possible shift count calculator 34' are identical with the least significant sign bit detector 32 and the maximum possible shift count calculator 34, respectively. For another example, it is assumed that the data of the first and second inputs are only unsigned binary dare. In this case, the shifter control unit 11' shown in FIG. 6 may include maximum possible shift count determining units 21" and 22" each having a most significant bit detector 31" and the maximum possible shift count calculator 34", as shown in FIG. 8. The most significant bit detector 31" and the maximum possible shift count calculator 34" are identical with the most significant bit detector 31 and the maximum possible shift count calculator 34. According to the processor of this example, an operation result without causing an overflow and with a small error can be also obtained depending on the values of the input data.

In the above description, the bit width of the input data and the processing bit width are both 8 bits. However, it is appreciated that any desired bit width can be used, whereby the same effects can be attained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A processor comprising:

first shift means for receiving a first signal indicating a first shift count and for shifting first input data in accordance with said first shift count;

second shift means for receiving a second signal indicating a second shift count and for shifting second input data in accordance with said second shift count;

operation means, connected to said first shift means and said second shift means, for performing arithmetic and logic operations for the output of said first shift means and the output of said second shift means;

third shift means, connected to said operation means, for receiving a third signal indicating a third shift count and for shifting the output of said operation means in accordance with said third shift count;

first coefficient storing means for storing a coefficient for said first input data;

second coefficient storing means for storing a coefficient for said second input data; and shift control means connected to said first shift means, said second shift means, said third shift means, said first coefficient storing means, and said second coefficient storing means, for determining said first shift count for said first shift means, said second shift count for said second shift means, and said third shift count for said third shift means based on a binary value of said first input data which is input to said operation means, a binary value of said second input data which is input to said operation means, said coefficient stored in said first coefficient storing means, and said coefficient stored in said second coefficient storing means, for outputting said first signal indicating said first shift count to said first shift means, for outputting said second signal indicating said second shift count to said second shift means, and for outputting said third signal indicating said third shift count to said third shift means; said shift control means further includes:

first maximum possible shift count determining means for determining the maximum possible shift count $A_{MAX}$ for said first input data;

second maximum possible shift count determining means for determining the maximum possible shift count $B_{MAX}$ for said second input data;

bit shift difference calculating means connected to said first coefficient storing means and said second coefficient storing means, for obtaining a difference d between the coefficient $R_1$ stored in said first coefficient storing means and the coefficient $R_2$ stored in said second coefficient storing means; and shift count determining means connected to said first maximum possible shift count determining means, said second maximum possible shift count determining means, and said bit shift difference calculating means, for determining shift counts for said first shift means and said second shift means as a function of said maximum possible shift count $A_{MAX}$, maximum possible shift count $B_{MAX}$, and said difference d, and for determining a shift count in said third shift means based on one of said determined shift counts for said first shift means and said second shift means.

2. A processor according to claim 1, wherein said shift count determining means determines an integer A which is a maximum integer of variable A' and an integer B which is a maximum integer of variable B', wherein said variable A' and said variable B' are integers satisfying the conditions of $A'-B'=d$, and $A' \leq A_{MAX}$ and $B' \leq B_{MAX}$, and said shift count determining means determines an integer C as the shift count in said third shift means, wherein said integer C satisfies the conditions of $C=R_1-A$ or $C=R_2-B$.

3. A processor according to claim 1, wherein each of said first maximum possible shaft count determining means and said second maximum possible shift count determining means includes: most significant bit detecting means for detecting the position where a bit of "1" first appears by checking the input data from the most significant bit; and maximum possible shift count calculating means for calculating the maximum possible shift count for said input data, based on said detected position.

4. A processor according to claim 1, wherein each of said first maximum possible shift count determining means and said second maximum possible shift count determining means includes: least significant sign bit detecting means for detecting, when the most significant bit of the input data is "1", the position where a bit of "0" first appears by checking said input data from said most significant bit, and for detecting, when said most significant bit of said input data is "0", the position where a bit of "1" first appears by checking said input data from said most significant bit; and maximum possible shift count calculating means for calculating the maximum possible shift count for said input data, based on said detected position.

5. A processor according to claim 1, wherein, to each of said first shift means, said second shift means, said third shift means, and said shift control means, a control signal indicating whether the input data is signed binary data or unsigned binary data is applied.

6. A processor according to claim 1, wherein, to each of said first shift means, said second shift means, and said third shift means, a control signal indicating whether the input data is signed binary data or unsigned binary data is applied, and wherein each of said first shift means, said second shift means, and said third shift means includes:

logic shift means for logically shifting said input data;

arithmetic shift means for arithmetically shifting said input data; and selecting means, connected to said logic shift means and said arithmetic shift means, for selectively outputting either one of the output of said logic shift means or the output of said arithmetic shift means.

7. A processor according to claim 1, wherein to each of said first maximum possible shift count determining means and said second maximum possible shift count determining means, a control signal indicating whether the input data is signed binary data or unsigned binary data is applied, and wherein each of said first maximum possible shift count determining means and said second maximum possible shift count determining means includes:

most significant bit detecting means for detecting the position where a bit of "1" first appears by checking said input data from the most significant bit;

least significant sign bit detecting means for detecting, when the most significant bit of said input data is "1", the position where a bit of "0" first appears by checking said input data from said most significant bit, and for detecting, when said most significant bit of said input data is "0", the position where a bit of "1" first appears by checking said input data from said most significant bit;

selecting means, connected to said most significant bit detecting means and said least significant sign bit detecting means, for selectively outputting either one of the output of said most significant bit detecting means or the output of said least significant sign bit detecting means; and maximum possible shift count calculating means, connected to said selecting means, for calculating the maximum possible shift count for said input data, based on the output of said selecting means.

* * * * *

UNITED STATES PATENT AND TRADE MARK OFFICE
CERTIFICATE OF CORRECTION

PATENT NO. : 5,528,525
DATED : June 18, 1996
INVENTOR(S) : Suzuki et al.

It is certified that error appears in the above-identified patent and that said Letters Patent is hereby corrected as shown below:

Column 11, line 16, after "$A_{MAX}$," insert --said--.

Column 11, line 31, "shaft" should be --shift--.

Signed and Sealed this

Twenty-sixth Day of November 1996

Attest:

BRUCE LEHMAN

*Attesting Officer*     *Commissioner of Patents and Trademarks*